United States Patent

Ressel et al.

[11] Patent Number: 5,909,111
[45] Date of Patent: Jun. 1, 1999

[54] METHOD AND APPARATUS FOR CONTROLLING A CURRENT

[75] Inventors: Hartmut Ressel, Reutlingen; Christoph Land, Weil Im Schoenbuch, both of Germany

[73] Assignee: Robert Bosch GmbH, Stuttgart, Germany

[21] Appl. No.: 08/957,655

[22] Filed: Oct. 24, 1997

[30] Foreign Application Priority Data

Oct. 26, 1996 [DE] Germany .......................... 196 44 611

[51] Int. Cl.[6] ........................................ G05F 1/56
[52] U.S. Cl. ............................................... 323/283
[58] Field of Search .................... 323/266, 273, 323/274, 280, 282, 283, 284, 285

[56] References Cited

U.S. PATENT DOCUMENTS

| 4,335,694 | 6/1982 | Mausner et al. | 123/478 |
| 5,160,928 | 11/1992 | Rigat-Esselin et al. | 323/280 |
| 5,166,543 | 11/1992 | Schneider et al. | 323/288 |
| 5,313,153 | 5/1994 | Locher et al. | |
| 5,467,000 | 11/1995 | Bauer et al. | 318/432 |
| 5,687,050 | 11/1997 | Bartsch | 361/154 |

FOREIGN PATENT DOCUMENTS

| 0 252 638 | 1/1988 | European Pat. Off. |
| 38 05 031 | 2/1988 | Germany . |
| 1 473 162 | 5/1977 | United Kingdom . |
| 2 234 370 | 1/1991 | United Kingdom . |

*Primary Examiner*—Matthew Nguyen
*Attorney, Agent, or Firm*—Kenyon & Kenyon

[57] ABSTRACT

A method and an apparatus for controlling, in particular, an operating parameter of an internal combustion engine. A variable can be defined as a function of an actual value and a setpoint. As a function of the variable, a controller defines a manipulated variable for application to a control element. A microcomputer determines a variable for influencing the response characteristics of the controller, and at least one activation variable for influencing the manipulated variable.

12 Claims, 1 Drawing Sheet

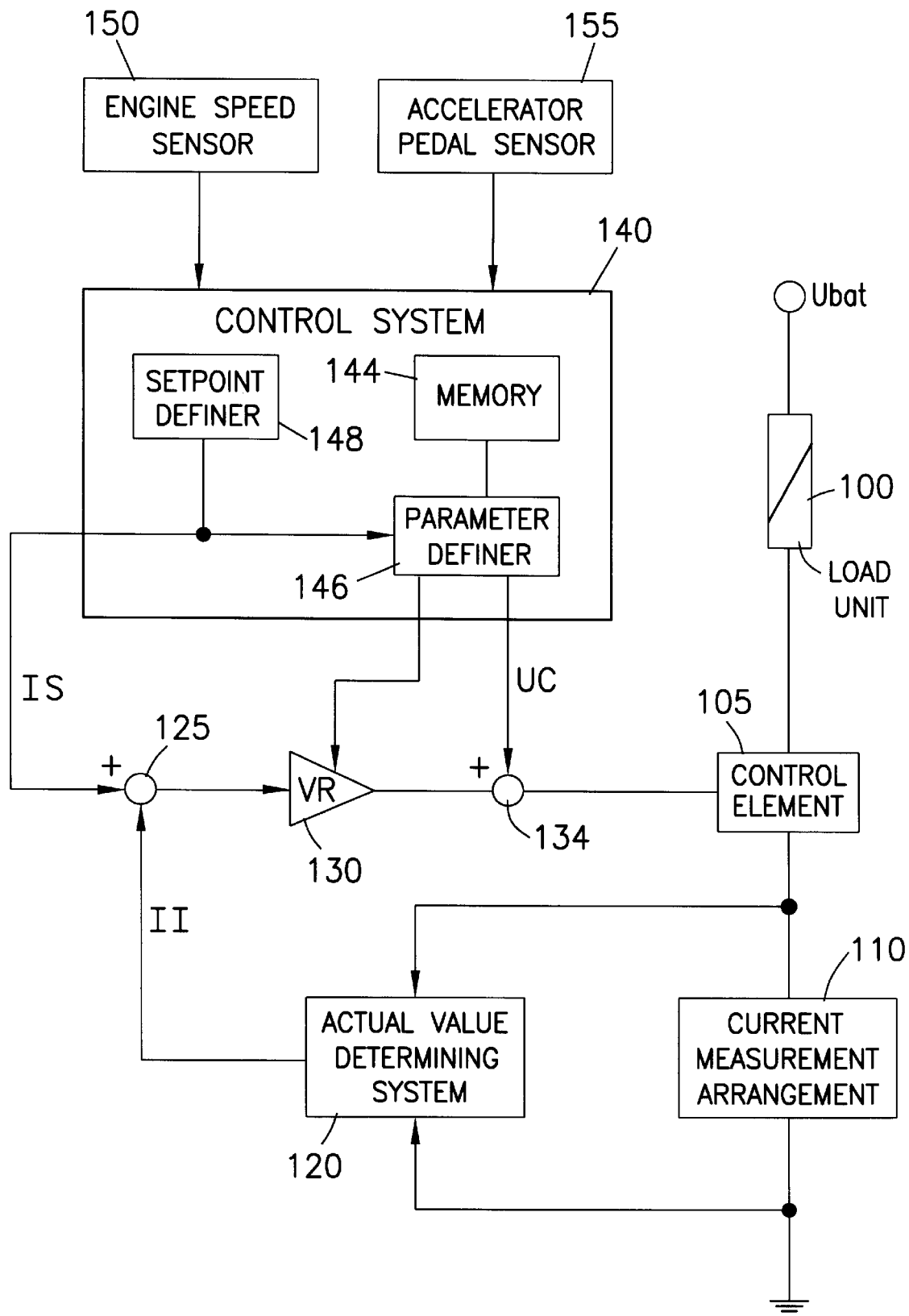
FIGURE

METHOD AND APPARATUS FOR CONTROLLING A CURRENT

FIELD OF THE INVENTION

The present invention relates to a method and an apparatus for controlling a current.

BACKGROUND INFORMATION

A method and apparatus for controlling the current which flows through a load unit of an internal combustion engine are known from German Patent No. 38 05 031 and from its corresponding U.S. Pat. No. 5,313,153. Those describe a method and an apparatus for controlling the current which flows through a load unit. An activating signal for application to a switching means can be defined as a function of a setpoint and an actual value for the current.

If high control accuracy is necessary in this control loop, this requires high control gain in the controller. The design of the control amplifier is problematic in terms of the stability of the control loop and the high control gain.

SUMMARY OF THE INVENTION

An object of the present invention is to make available a controller which regulates the control variable with high accuracy and operates in stable fashion without oscillations, in particular without overshoots. In addition, the controller is intended to be flexibly usable.

The method and apparatus according to the present invention make it possible, for a given controlled system, to implement a controller having stringent control loop requirements. The controller possesses high flexibility. In addition, end-of-line programming by means of software is possible. These properties are achieved with very good control accuracy and good dynamic behavior.

BRIEF DESCRIPTION OF THE DRAWING

The FIGURE shows a block diagram of the apparatus according to an exemplary embodiment of the present invention.

DETAILED DESCRIPTION

In the FIGURE, the method and apparatus according to the present invention are depicted with reference to a block diagram. A load unit is designated 100. In the case of the exemplary embodiment, this load unit is a solenoid valve which controls the injection of fuel into an internal combustion engine, in particular a diesel internal combustion engine.

A control element is designated 105. A current measurement means (arrangement), which in the case of the exemplary embodiment being described is configured as a resistor, is designated 110. Load unit 100, control element 105, and current measurement means 110 are connected in series between a supply voltage Ubat and a ground terminal. The sequence of elements depicted is only exemplary. The elements can also be arranged in a different sequence.

In addition, further elements, for example a second switching means (arrangement) that is arranged between load unit 100 and supply voltage Ubat, can also be provided. Free-running elements and quenching diodes can also be provided. These elements are not depicted.

The two terminals of the current measurement means are guided to an actual value determining system 120. The actual value determining system delivers to a node 125 an actual value (II) of the current that is flowing through load unit 100. A setpoint (IS) is applied to the second input of node 125. The output signal of node 125, which constitutes the difference between the two signals, arrives at a controller 130 which has a control gain VR.

The output signal of controller 130 arrives at a node 134. The output signal of node 134 activates control element 105.

Setpoint (IS) is made available by a control system 140. Control system 140 processes the output signals of various sensors, for example an engine speed sensor 150 and an accelerator pedal sensor 155. Engine speed sensor 150 makes available an engine speed signal N, and accelerator pedal sensor 155 makes available a signal FP which corresponds to the accelerator pedal position.

On the basis of these variables and further operating parameters, a setpoint definer 148 makes available setpoint IS. The setpoint IS also arrives at a parameter definer 146, which applies a signal VR to controller 130 and a signal UC to node 134. Parameter adapter system (parameter definer) 146 also processes the data stored in a memory means (arrangement) 144. A nonvolatile memory which does not lose its contents upon shutdown of the device is preferably used as memory 144.

The control system 140 is preferably configured as a microcomputer. The controller 130 used is preferably an analog controller which is configured, for example, using hybrid technology. A field-effect transistor preferably serves as control element 105.

The arrangement described is usable not only in a system for controlling the current through a load unit. It can also be used in other systems for controlling other operating parameters of an internal combustion engine. For example, the voltage or position of an actuator can be regulated.

A device of this kind operates as follows. On the basis of various signals—for example engine speed N of the internal combustion engine, accelerator pedal position FP, and other variables that are not depicted—the control system calculates an activation signal for application to load unit 100.

In the case of the exemplary embodiment depicted, load unit 100 is a coil of a solenoid valve which determines the quantity of fuel to be injected. The injection operation can be controlled by opening and closing the solenoid valve. During activation, the current is usually regulated to different values. For example, a high starting current is set at the beginning of activation, and the current is regulated to a lower holding current after a waiting time has elapsed or when a predefined current level has been reached.

Also possible are applications in which the solenoid valve assumes a certain position as a function of the current that is flowing. For all applications with corresponding control systems for load units, it is important that the current through the load unit be regulated to the setpoint with high accuracy. In addition, the setpoints must be reached as quickly as possible.

On the basis of the various operating parameters, setpoint definer 148 defines a setpoint (IS). The setpoint (IS) is combined with actual value (II) at node 125. On the basis of this control deviation, controller 130 determines the activation signal for application to control element 105. The actual value is defined by actual value determining system 120 on the basis of the voltage drop at a measurement resistor 110. The actual value can also be determined in other ways.

The properties of controller 130 must be adapted to the controlled system constituted by the control element 105 and the load unit 100 because the controlled system has different response characteristics depending on the load unit 100 and the control element 105. In order to be able to implement a control loop that has good dynamic behavior and high control gain without the tendency to oscillate, the control loop parameters and the control gain of controller 130 must be adapted accordingly.

For cost reasons, it is desirable to manufacture large quantities of a unit in order to reduce costs. To be able to achieve such large quantities, it must be possible to use the same controllers for different controlled systems, i.e. for example different solenoid valves. To do so, the controller must be adapted manually to the controlled system during manufacture and/or assembly. Often such adaptation is not possible, or is possible only with a great deal of effort.

In the case of the exemplary embodiment, the controlled system possesses a gain (VS) which is less than 1. In addition, it has low cutoff frequencies F1 and F2. The cutoff frequencies F1 and F2 are based on the inductance of the load unit 100 and the necessary gate dropping resistance and Miller capacitance of control element 105.

In order to achieve high accuracy at low gains (VS) of the controlled system, the gain VR of the controller 130 must be set high. In order to achieve a stable control loop with these controller and controlled system definitions, the controller 130 must possess low cutoff frequencies.

The controlled system is moreover affected by tolerances, i.e. the properties of different individual units deviation from one another.

According to the present invention, provision is made for the same controller 130 to be used for all controlled systems, and for adaptation to the controlled system to be performed by control system 140. For this purpose, provision is made for parameters to be stored in memory 144, and for parameter adapter system 146 to define, on the basis of setpoint IS and the stored values, the parameters VR and UC with which the parameters are adapted.

As a result, not only is the gain (VR) of controller 130 defined, but a voltage (UC) is also defined by control system 140.

According to the present invention, a broad-band control amplifier is used for controller 130. The gain (VR) of control amplifier 130 should be set so that given the phase reserves to be maintained determined by the controlled system and the necessary transient characteristics, the desired gain (V) of the overall control loop satisfies the following condition:

$$V=VRMAX*VS<1$$

The resulting value VRMAX, the maximum possible control gain (VR) of control amplifier 130, however, is not sufficient for the necessary control accuracy.

According to the present invention, therefore, the control voltage (UC) is fed into the controller by control system 140. According to the present invention, the voltage (UC) is defined as a function of the setpoint (IS), the gain (VS) of the controlled system, and the voltage (UTH). The voltage (UTH) corresponds to the threshold voltage of control element 105. In the case of a field-effect transistor, this is the voltage above which current flow begins.

Control system 140 is preferably configured as a microcomputer. The microcomputer defines the variable (VR) which influences the response characteristics of the controller. In addition, the microcomputer 140 defines the activation variable (UC) for influencing the manipulated variable.

The parameters for each control loop or all control loops of identical design, which in particular have the same control elements and the same load units, are determined by a one-time measurement. In particular this measurement is made at the end of the assembly line and stored in nonvolatile memory 144. Preferably the activation variable (UC) as a function of setpoint (IS), the variable (VS) which determines the response characteristics of the control element 105, and/or the variable (VR) which determines the response characteristics of the controller 130, are stored in the memory 144. The controller 130 can thus, by defining the control parameters, adapt optimally to the controlled system. In particular, the activation variable (UC) and the gain of the controlled system (VS) are measured and stored in memory 144.

In one embodiment, the activation variable (UC) is continuously calculated by the microcomputer as a function of the setpoint (IS), the gain (VS) of the controlled system, and the variable (UTH). This calculation occurs in such a way that the stability condition is achieved at the desired gain. The calculation is preferably performed according to the following formula:

$$UC=(IS/VS)+UTH$$

By suitably defining the response characteristics (VR) of the controller and the activation variables, it is possible, for a defined controlled system with defined control loop parameters, to achieve a control amplifier that possesses, to a first approximation, aperiodic transient characteristics for the control variable, and a high control accuracy. The value (VR) is defined so that even under unfavorable operating conditions, the condition for the desired gain (V) of the overall control loop $$V=VR * VS<1$$

is met, where VS indicates the gain of the control element, and VR the gain of the controller. It is particularly advantageous if different values of VR are defined for different operating conditions.

What is claimed is:

1. A method for controlling a current, comprising the steps of:

defining a variable determining response characteristics of a controller;

defining at least one activation variable;

determining, using the controller, a manipulated variable as a function of an actual value and a setpoint value of the current, a variable depending on response characteristics of a control element and the at least one activation variable; and providing the manipulated variable to the control element.

2. The method according to claim 1, wherein the at least one activation variable is defined as a function of at least one of the setpoint value and the variable depending on the response characteristics of the control element.

3. The method according to claim 1, wherein the variable determining the response characteristics of the controller is defined as a function of the variable depending on the response characteristics of the control element.

4. The method according to claim 2, wherein the at least one activation variable, the variable depending on the response characteristics of the control element, and the variable determining the response characteristics of the controller are stored in a nonvolatile memory.

5. The method according to claim 1, further comprising the step of regulating the current flowing through a load unit to a setpoint.

6. An apparatus for controlling a current, comprising:
- a controller defining, as a function of a first variable defined as a function of an actual value and a setpoint value, a manipulated variable provided to a control element; and
- a microcomputer determining a second variable representing response characteristics of the controller and defining at least one activation variable for influencing the manipulated variable as a function of a third variable which depends on response characteristics of the control element.

7. The apparatus according to claim 6, wherein the current is applied to a load unit for influencing a fuel injection into an internal combustion engine.

8. The apparatus according to claim 6, wherein the control element includes a field-effect transistor.

9. The apparatus according to claim 6, wherein the microcomputer continuously calculates the at least one activation variable as a function of the setpoint value, the third variable which depends on the response characteristics of the control element, and a threshold voltage of the control element.

10. The method according to claim 1, wherein the setpoint value is determined as a function of an engine speed signal and an accelerator pedal position signal.

11. The apparatus according to claim 6, wherein the setpoint value is determined as a function of an engine speed signal and an accelerator pedal position signal.

12. The apparatus according to claim 6, wherein the second variable is defined as a function of the third variable.

* * * * *